(12) United States Patent
Asuncion et al.

(10) Patent No.: US 9,372,914 B1
(45) Date of Patent: Jun. 21, 2016

(54) DETERMINING COMPUTING DEVICE CHARACTERISTICS FROM COMPUTER NETWORK ACTIVITY

(71) Applicant: Google Inc., Mountain View, CA (US)

(72) Inventors: Arthur Asuncion, Kirkland, WA (US); Johannes Christian Schuler, Kirkland, WA (US); Gregory Sean Corrado, Mountain View, CA (US); Kai Chen, Los Angeles, CA (US); Yong Sheng, Kirkland, WA (US)

(73) Assignee: GOOGLE INC., Mountain View, CA (US)

( * ) Notice: Subject to any disclaimer, the term of this patent is extended or adjusted under 35 U.S.C. 154(b) by 219 days.

(21) Appl. No.: 14/154,904

(22) Filed: Jan. 14, 2014

(51) Int. Cl.
*G06F 17/30* (2006.01)

(52) U.S. Cl.
CPC ............................... *G06F 17/30598* (2013.01)

(58) Field of Classification Search
CPC .......... G06F 17/30616; G06F 17/3071; G06F 17/30864
USPC ............ 707/738, 706, 769; 705/2, 14.4, 7.29; 709/223, 224; 714/47.3
See application file for complete search history.

(56) References Cited

U.S. PATENT DOCUMENTS

| | | | |
|---|---|---|---|
| 7,603,458 B1 * | 10/2009 | Sexton | H04L 41/065 709/224 |
| 9,037,600 B1 * | 5/2015 | Garrigues | G06F 17/30244 707/769 |
| 2003/0037041 A1 | 2/2003 | Hertz | |
| 2003/0093792 A1 | 5/2003 | Labeeb et al. | |
| 2005/0004923 A1 * | 1/2005 | Park | G06Q 30/02 |
| 2005/0015474 A1 * | 1/2005 | Kavacheri | G06F 21/35 709/223 |
| 2005/0210008 A1 | 9/2005 | Tran et al. | |
| 2005/0289401 A1 * | 12/2005 | Goin | G06F 11/0709 714/47.3 |
| 2007/0208719 A1 | 9/2007 | Tran | |
| 2008/0195621 A1 * | 8/2008 | Tedesco | G06F 21/10 |
| 2008/0214148 A1 | 9/2008 | Ramer et al. | |
| 2008/0294584 A1 | 11/2008 | Herz | |
| 2009/0222329 A1 | 9/2009 | Ramer et al. | |
| 2009/0234711 A1 | 9/2009 | Ramer et al. | |
| 2009/0234861 A1 | 9/2009 | Ramer et al. | |
| 2009/0234878 A1 | 9/2009 | Herz et al. | |
| 2009/0240568 A1 | 9/2009 | Ramer et al. | |
| 2009/0240569 A1 | 9/2009 | Ramer et al. | |
| 2009/0240586 A1 | 9/2009 | Ramer et al. | |
| 2009/0319350 A1 * | 12/2009 | Cansler | G06Q 30/0241 705/14.4 |

(Continued)

*Primary Examiner* — Jeffrey A Burke
*Assistant Examiner* — Thong Vu
(74) *Attorney, Agent, or Firm* — Armstrong Teasdale LLP (57) ABSTRACT

Systems and methods of determining computing device characteristics from computer network activity are provided. A data processing system can obtain data identifying a global cluster that indicates an interest category and can create a sub-cluster of the global cluster based on a characteristic common to content access computing devices. A weight indicating a correlation between the characteristic common to content access computing devices and the interest category can be assigned to the sub-cluster. Responsive to a communication between a first content access computing device and a content publisher computing device, the data processing system can identify a characteristic. The data processing system can associate the first content access computing device with the sub-cluster based on the characteristic of the first content access computing device and the characteristic common to the content access computing devices, and based on the weight can determine a status of the first content access computing device.

20 Claims, 4 Drawing Sheets

(56) References Cited

U.S. PATENT DOCUMENTS

| | | |
|---|---|---|
| 2010/0048242 A1 | 2/2010 | Rhoads et al. |
| 2010/0063877 A1 | 3/2010 | Soroca et al. |
| 2010/0076994 A1 | 3/2010 | Soroca et al. |
| 2010/0094878 A1 | 4/2010 | Soroca et al. |
| 2010/0312650 A1 | 12/2010 | Pinckney et al. |
| 2010/0312724 A1 | 12/2010 | Pinckney et al. |
| 2010/0332583 A1 | 12/2010 | Szabo |
| 2011/0258049 A1 | 10/2011 | Ramer et al. |
| 2011/0261049 A1 | 10/2011 | Cardno et al. |
| 2011/0302117 A1 | 12/2011 | Pinckney et al. |
| 2011/0307478 A1 | 12/2011 | Pinckney et al. |
| 2012/0004924 A1* | 1/2012 | Kachnowski ......... G06F 19/345 705/2 |
| 2012/0173379 A1 | 7/2012 | Soroca et al. |
| 2012/0179568 A1 | 7/2012 | Soroca et al. |
| 2012/0185349 A1 | 7/2012 | Soroca et al. |
| 2012/0209710 A1 | 8/2012 | Ramer et al. |
| 2012/0215640 A1 | 8/2012 | Ramer et al. |
| 2012/0289147 A1 | 11/2012 | Raleigh et al. |
| 2013/0055097 A1 | 2/2013 | Soroca et al. |
| 2013/0097664 A1 | 4/2013 | Herz et al. |
| 2013/0124449 A1 | 5/2013 | Pinckney et al. |
| 2013/0254035 A1 | 9/2013 | Ramer et al. |
| 2013/0273968 A1 | 10/2013 | Rhoads et al. |
| 2013/0297582 A1* | 11/2013 | Zukovsky ......... G06F 17/30867 707/706 |
| 2013/0304581 A1 | 11/2013 | Soroca et al. |
| 2013/0304691 A1 | 11/2013 | Pinckney et al. |
| 2013/0329973 A1* | 12/2013 | Cao ..................... A61B 5/0033 382/128 |
| 2014/0143012 A1* | 5/2014 | Alon ................. G06Q 30/0202 705/7.29 |
| 2015/0237183 A1* | 8/2015 | Novet ............... H04M 1/72569 455/556.1 |

* cited by examiner

DETERMINING COMPUTING DEVICE CHARACTERISTICS FROM COMPUTER NETWORK ACTIVITY

BACKGROUND

In a computer networked environment such as the internet, entities such as people or companies can provide information for public display on web pages or other online documents. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a computer implemented method of determining computing device characteristics from computer network activity. The method can access, by one or more processors of a data processing system from a database, data identifying a global cluster. The global cluster can indicate an interest category determined based on communications between a plurality of content access computing devices and a plurality of content publisher computing devices. The method can identify a sub-cluster of the global cluster based on a characteristic common to content access computing devices that are associated with the interest category indicated by the global cluster. The method can identify a correlation between the characteristic and the interest category, and can identify an interest associated with a first content access computing device not associated with the global cluster, based on a communication between the first end user computing device and a first content publisher computing device via a computer network. The method can associate the first content access computing device with the global cluster based on the interest associated with the first content access computing device and the interest category, and can determine a status of the first content access computing device based on the correlation between the characteristic and the interest category.

At least one aspect is directed to a system of determining computing device characteristics from computer network activity. The system includes a data processing system having one or more processors that can access, from a database, data identifying a global cluster. The global cluster can indicate an interest category determined based on communications via a computer network between a plurality of content access computing devices and a plurality of content publisher computing devices. The one or more processors can identify a sub-cluster of the global cluster based on a characteristic common to content access computing devices that are associated with the interest category indicated by the global cluster, and can identify a correlation between the characteristic and the interest category. The one or more processors can identify an interest associated with a first content access computing device not associated with the global cluster, based on a communication between the first end user computing device and a first content publisher computing device via a computer network, and can associate the first content access computing device with the global cluster based on the interest associated with the first content access computing device and the interest category. The one or more processors can determine a status of the first content access computing device based on the correlation between the characteristic and the interest category.

At least one aspect is directed to a computer readable storage device storing instructions that when executed by one or more data processors, cause the one or more data processors to perform operations. The operations can include accessing, from a database, data identifying a global cluster. The global cluster can indicate an interest category determined based on communications between a plurality of content access computing devices and a plurality of content publisher computing devices. The operations can include identifying a sub-cluster of the global cluster based on a characteristic common to content access computing devices that are associated with the interest category indicated by the global cluster, and identifying a correlation between the characteristic and the interest category. The operations can include identifying an interest associated with a first content access computing device not associated with the global cluster, based on a communication between the first end user computing device and a first content publisher computing device via a computer network, and associating the first content access computing device with the global cluster based on the interest associated with the first content access computing device and the interest category. The operations can include determining a status of the first content access computing device based on the correlation between the characteristic and the interest category.

At least one aspect is directed to a computer implemented method of determining computing device characteristics from computer network activity. The method can include obtaining, by a data processing system from a database, data identifying a global cluster. The global cluster can indicate an interest category based on communications between a plurality of content access computing devices and a plurality of content publisher computing devices. The method can include creating a sub-cluster of the global cluster based on a characteristic common to content access computing devices. The sub-cluster can indicate the interest category. The method can include assigning a weight to the sub-cluster. The weight can indicate a correlation between the characteristic common to content access computing devices and the interest category. The method can include identifying a communication between a first content access computing device and a first content publisher computing device via a computer network, and identifying an interest associated with the first content access computing device responsive to the communication. The method can include associating the first content access computing device with the global cluster based on the interest associated with the first content access computing device and the interest category of the global cluster. The method can include determining a status of the first content access computing device based on the weight assigned to the sub-cluster.

At least one aspect is directed to a system of determining computing device characteristics from computer network activity. The system includes a data processing system that can obtain from a database data identifying a global cluster. The global cluster can indicate an interest category based on communications via a computer network between a plurality of content access computing devices and a plurality of content publisher computing devices. The data processing system can create a sub-cluster of the global cluster based on a characteristic common to content access computing devices. The sub-cluster can indicate the interest category. The data processing system can assign a weight to the sub-cluster, the weight indicating a correlation between the characteristic common to content access computing devices and the interest category. The data processing system can identify a communication between a first content access computing device and a first content publisher computing device via the computer network, and can identify an interest associated with the first content access computing device responsive to the communication. The data processing system can associate the first content access computing device with the global cluster based on the interest associated with the first content access computing device and the interest category. The data processing system can determine a status of the first content access computing device based on the weight assigned to the sub-cluster.

At least one aspect is directed to a computer readable storage device storing instructions that when executed by one or more data processors, cause the one or more data processors to perform operations. The operations can include obtaining data identifying a global cluster, the global cluster indicating an interest category based on communications between a plurality of content access computing devices and a plurality of content publisher computing devices, and creating a sub-cluster of the global cluster based on a characteristic common to content access computing devices, the sub-cluster indicating the interest category. The operations can include assigning a weight to the sub-cluster, the weight indicating a correlation between the characteristic common to content access computing devices and the interest category, and identifying a communication between a first content access computing device and a first content publisher computing device via a computer network. The operations can include identifying an interest associated with the first content access computing device responsive to the communication, and associating the first content access computing device with the global cluster based on the interest associated with the first content access computing device and the interest category. The operations can include determining a status of the first content access computing device based on the weight assigned to the sub-cluster.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of providing information via a computer network. The various concepts introduced above and discussed in greater detail below may be implemented in any of numerous ways, as the described concepts are not limited to any particular manner of implementation.

Systems and methods of the present disclosure relate generally to determining computing device characteristics from computer network activity, and creating a model indicative of this activity. Based at least in part on the computing device characteristics as indicated by the model, a status of an content access computing device such as a desktop computer or a smartphone can be determined. The status of the content access computing device can be used, for example, to identify content items such as ads as candidates for display with an information resource such as a web page by the content access computing device.

For example, a data processing system can generate or obtain a universal model organizing data associated with network activity of content access computing devices into global clusters, where each cluster indicates an interest category. One example of a global cluster is a global cluster for content access computing devices interested in subject matter about soccer. The data processing system can obtain information from communications sessions via the internet or other computer network between content access computing devices and content publisher computing devices (e.g., a server hosting a website about soccer). This information can be obtained without personally identifying end users of the content access computing devices. The data processing system can also generate sub-clusters of the global clusters, where the sub-clusters indicate the same interest category of the global cluster and the sub-cluster is based on content access computing devices having a common characteristic. For example, the data processing system can create a sub-cluster for content access computing devices that have an interest in subject matter of the global cluster (e.g., soccer) and that share a location, device type, or social statistic common characteristic (e.g. the content access computing devices are located in France).

The data processing system can assign a weight to the sub-cluster that indicates a correlation between the characteristic and the interest category. For example, the data processing system can assign a weight of 0.35 to the sub-cluster, indicating that 0.35 or 35% of content access computing devices that are interested in soccer and are located in France belong to a particular social statistic. The data processing system can generate a joint model, using deep neural network or logistic regression techniques, for a number of global clusters (e.g., thousands, tens or hundreds of thousands or more), and their associated sub-clusters and weights. This data can be stored in a database and accessed to predict a status of an content access computing device.

The data processing system can also identify a computer network (e.g., internet) communication between an content access computing device and a content publisher computing device. For example, a tablet computer not necessarily associated with generation of the model, can communicate with a website server to request rendering of a web page associated with the website server by the tablet computer. Responsive to this request to display a web page, the web server (or the tablet computer) can communicate with the data processing system to request a content item (e.g., an ad) to provide for display in a content item slot of the web page. In this example, the data processing system can access the model data from the database to determine that the tablet computer is associated with an interest in soccer (e.g., the interest category of the global cluster) based, for example, on voluntary self-declared information provided to the data processing system by an end user of the tablet computer, or based on subject matter of web pages accessed by the tablet computer.

Responsive to this match between the content access computing device and the global cluster, the data processing system can assign a status to the tablet computer based on the weight assigned to the sub-cluster. For example, the status can indicate a 35% likelihood that the table computer is located in France. This information can be used by a content item placement server, which may or may not be part of the data processing system, to select a content item for display by the tablet computer with a web page or other information resource. For example, the content item may include subject matter relevant to French citizens, such as an ad for a candidate for public office in a French election.

The common characteristic of the end user devices of a sub-cluster (e.g., devices located in France) can include characteristics other than geographic or nationalistic characteristics. For example, the common characteristic can include common types of content access computing devices (example types include mobile devices, smartphones, or desktop computers), common social statistics, common geographic locations within or across countries (e.g., New England, Eastern Europe, the Pacific Rim, or Quebec), or common affinities or interests.

The systems and methods described herein can share statistical strength across different countries, contexts, and categories to facilitate content item selection for placement with information resources. The global and sub-clusters can be created based on characteristics of content access computing devices by implementing logistic regression or neural networking joint modeling models.

Figure 1:
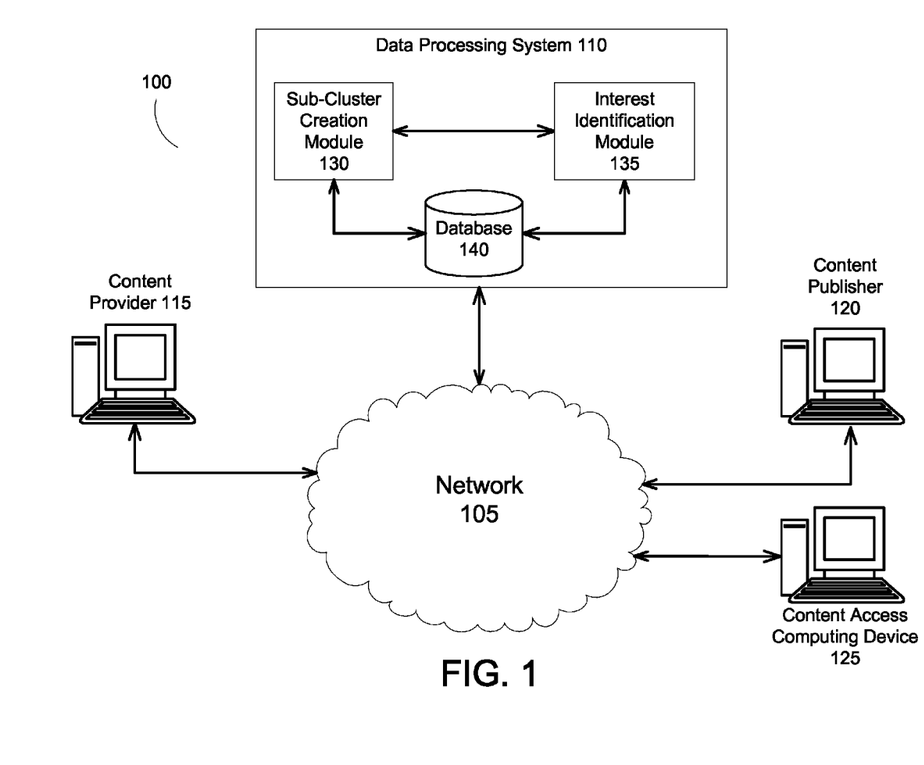
FIG. 1 is a block diagram depicting one example environment in which computing device characteristics can be determined from computer network activity, according to an illustrative implementation.

FIG. 1 illustrates an example system 100 for determining computing device characteristics via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for example with at least one content provider computing device 115, at least one content publisher computing device 120, or at least one content access computing device 125.

The data processing system 110 can include at least one server. For example, the data processing system 110 can include a plurality of servers located in at least one data center or server farm. In one implementation, the data processing system 110 includes a content placement system, e.g., an ad server or ad placement system. The data processing system 110 can include at least one sub-cluster creation module 130, at least one interest identification module 135, and at least one database 140. The sub-cluster creation module 130 and the interest identification module 135 can each include at least one processing unit, server, virtual server, circuit, engine, agent, or other logic device such as programmable logic arrays configured to communicate with the database 140 and with other computing devices (e.g., the content provider computing device 115, the content publisher computing device 120, or the content access computing device 125) via the network 105. The sub-cluster creation module 130, and the interest identification module 135 can include or execute at least one computer program or at least one script. The sub-cluster creation module 130 and the interest identification module 135 can be separate components, a single component, or part of the data processing system 110. The sub-cluster creation module 130 and the interest identification module 135 can include combinations of software and hardware, such as one or more processors configured to execute one or more scripts to identify global clusters, create sub-clusters, assign weights to the sub-cluster or to the global cluster, identify communications between content access computing devices, associate content access computing devices with global clusters, and determine statuses of content access computing devices based on weights assigned to sub-clusters, for example.

The content provider computing devices 115 can include servers or other computing devices operated by a content provider entity to provide content items such as advertisements for display on information resources at the content access computing device 125. The content provided by the content provider computing device 115 can include third party content items (e.g., ads) for display on information resources such as a website or web page that includes primary content, e.g. content provided by the content publisher computing device 120. The content items can also be displayed on a search results web page. For example, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other content access computing device 125.

The content publisher computing devices 120 can include servers or other computing devices operated by a content publishing entity to provide primary content for display via the network 105. For example, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing device 115. For example, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The content access computing devices 125 can include end user computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The content access computing device 125, the content provider computing device 115, and the content publisher computing device 120 can include desktop computers, laptop computers, tablet computers, smartphones, personal digital assistants, mobile devices, content access computing devices, consumer computing devices, servers, clients, and other computing devices. The content access computing device 125, the content provider computing device 115, and the content publisher computing device 120 can include user interfaces such as microphones, speakers, touchscreens, keyboards, pointing devices, a computer mouse, touchpad, or other input or output interfaces.

The data processing system 110 can include the sub-cluster creation module 130 and the interest identification module 135 as part of one or more servers of an online content item placement campaign system to determine at least one status of content access computing devices 125 and use this information to identify content items for display with information resources by the content access computing devices 125, for example as part of a content item placement campaign via the network 105. For example, the sub-cluster creation module 130 can be part of, or can include scripts executed by, one or more servers in a content placement system configured to identify sub-clusters of a global cluster, where content access computing devices 125 of the sub-cluster share a common characteristic.

The interest identification module 135 can be part of the same or a different server as the sub-cluster creation module 130 in the data processing system 110, e.g., a system that is part of or can provide data to a content placement system. The interest identification module 135 can identify interests or interest categories of content access computing devices 125 to create global clusters of content access computing devices 125 and sub-clusters of content access computing devices 125, and to associate the content access computing devices 125 with global clusters or sub-clusters.

In some implementations, the data processing system 110 obtains data identifying at least one global cluster. A global cluster can indicate a topic, such as a group of content access computing devices 125 associated with an interest in soccer, or with an interest in video games. The data processing system 110 can create or generate the global clusters, or can obtain global cluster information from the database 140. For example, another system can create global clusters and store them in the database 140 where they can be accessed by the data processing system 110.

To create global clusters, for example, the data processing system 110 can obtain information from communications between the content access computing devices 125 and content publisher computing devices 120 via the network 105. The information may include cookies obtained from the content access computing devices 125, or information about the subject matter of websites or other information resources hosted by the content publisher computing devices 120 and provided to the data processing system 110. The information may also include self-declared information received from the content access computing devices 125. For example, when communicating with interfaces of social networks or other information resources, end users of content access computing devices 125 can voluntarily enter general social statistics about themselves, that do not personally identify any end users, and that can also be shared by other users. From this information the data processing system 110 can implement neural network or logistic regression machine learning techniques to create a universal model that organizes content access computing devices into global clusters, e.g., groups, where individual global clusters indicate interest categories. For example, a global cluster of such a model can indicate a group of content access computing devices 125 having an interest in soccer. This interest can be determined, for example, based on access by the content access computing devices 125 to information resources of the content publisher computing devices 120 that have subject matter about soccer. The global cluster data or identifiers indicating a global cluster can be stored in the database 140 and accessed by the data processing system 110. The data processing system 110 can create or access global clusters on a large scale. For example, thousands or hundreds of thousands of global clusters can be created, and the global clusters can have varying granularity. For example, there can be global clusters of content access computing devices 125 interested in soccer in general, in watching soccer, in playing soccer, in professional soccer, in amateur soccer, or in coaching soccer.

The data processing system 110 or component thereof such as the sub-cluster creation module 130 can create sub-clusters of the global clusters. In some implementations, the sub-cluster indicates an interest in the same interest category as the global cluster. For example, for sub-clusters of a global cluster about soccer, the content access computing devices 125 associated with the sub-cluster can also be associated with the same interest in soccer. In some implementations, the data processing system 110 determines that a sub-group of the content access computing devices 125 of the global cluster share a common characteristic. For example, the global cluster of the content access computing devices 125 associated with an interest in soccer may include content access computing devices 125 located in various countries all over the world. In this example, the sub-cluster creation module 130 can create a sub-cluster of the content access computing devices 125 associated with the interest in soccer and also having the common characteristic of being physically located in France. The data processing system 110 can determine that these content access computing devices 125 are located in France based, for example, on information in the database 140, self-declared information received from the content access computing devices 125, or based on the subject matter of information resources such as web pages rendered by the content access computing devices 125.

The common characteristic shared by the content access computing devices 125 of the sub-cluster may but need not be geographic, location, or nation-state based. For example, the common characteristic can be a characteristic about content access computing device 125 type or location, or a generic social statistic or classification associated with users of the content access computing devices 125 that some segments of a human population may share and that other segments may not.

The data processing system 110 can identify a correlation between the characteristic and the interest category. For example, the data processing system 110 can assign a weight to the sub-cluster. The weight can indicate a correlation or relationship between at least one characteristic common to the content access computing devices 125 of the sub-cluster and the interest category of the sub-cluster. The weight can include a number within a range, such as from zero to one, or one to ten, or can include a percentage. For example, for the sub-cluster of the content access computing devices 125 sharing a common characteristic, such as a common social statistic, and that are associated with an interest in soccer, the data processing system 110 can assign a weight of 0.70 to the sub-cluster, indicating that 0.70 or 70% of the content access computing devices 125 interested in soccer also share the common social statistic of the sub-cluster, or indicating that the content access computing devices 125 associated with an interest in soccer have a 70% probability of also having the common social statistic. In some implementations, the generated clusters are soft clusters. For example, n content access computing device 125 can be 60% associated with sub-cluster "A" (indicating a first social statistic) and 40% associated with a sub-cluster "B" (indicating a second social statistic). Sub cluster "A" can be further divided into soft sub-clusters. For example, the data processing system 110 can determine that cluster A has a 55% weight or association with sub-cluster "A1", and a 45% association with sub-cluster "A2".

The weight determined by the data processing system 110 and assigned to the sub-cluster need not be a ratio or percentage. For example, the weight can be a binary indicator or a number compared to a threshold value, and based on the comparison the data processing system 110 can determine that the weight associated with the sub-cluster is sufficiently strong to rely upon for determining a status of at least one content access computing device 125 that is associated with an interest that matches the interest category of a global cluster.

In some implementations, the data processing system 110 identifies communications between the content access computing devices 125 and the content publisher computing devices 120. For example, a first content access computing device 125 can communicate with the content publisher computing device 125 via the network 105 to request access to an information resource (e.g., a web page) of the content publisher computing device 120. Responsive to this request, the first content access computing device 125 or the content publisher computing device 120 can communicate with the data processing system 110, for example to request a content item (e.g., ad or other third party content) from the content provider computing device 115 for display with the information resource (e.g., web page or other online document) by the first content access computing device 125.

The data processing system 110 can also identify the communication, and the interest identification module 135 or other data processing system 110 component can identify at least one interest associated with the first content access computing device 125. For example, based on self-declared information voluntarily made available by a user of the first content access computing device 125, that does not personally identify the user, or based on subject matter of information resources of the content publisher computing devices 120 accessed by the first content access computing device 125, the data processing system 110 can determine that the first content access computing device 125 is associated with an interest in soccer.

The data processing system 110 can associate the first content access computing device with the global cluster. In some implementations, the data processing system 110 can identify a match (e.g., total or partial) between the interest associated with the first content access computing device 125 and the interest category of the global cluster. For example, the data processing system 110 can associate the first content access computing device 125, associated with an interest in soccer, with the global cluster having an interest category that includes soccer. The data processing system 110 can make this association when the interest of the content access computing device 125 and that of the global cluster are semantically related or indicate similar subject matter but are not the same. For example, the first content access computing device 125 can be associated with an interest in "playing soccer", and the global cluster can have an interest category of "attending soccer matches" or "attending live sporting events."

In some implementations, the data processing system 110 determines a status of at least one content access computing device 125, e.g., the first content access computing device 125 of the above example that is associated with the global cluster. The status of the content access computing device 125 can indicate a conclusion, estimate, prediction, or determination made by the data processing system 110 regarding the content access computing device 125. For example, the status of the content access computing device 125 can indicate the geographic location of the content access computing device 125, the country, region, or political boundary within which the content access computing device 125 is located. The status of the content access computing device 125 can also indicate a type of device, such as a mobile device, tablet device, smartphone, personal digital assistant, desktop computer, or laptop computer for example. The status of the content access computing device 125 can indicate a social statistic of a population, such as a common characteristic shared by a sub-group of a population.

The status of the content access computing device 125 can also indicate characteristics such as the common characteristic of content access computing devices 125 of a sub-cluster. For example, from a global cluster that indicates a plurality of end user devices 125 having an interest in last-minute airplane tickets, the sub-cluster creation module 130 can create a sub-cluster that indicates a sub-group of the plurality of content access computing devices 125 that have the interest in last-minute airplane tickets and that also share the common characteristic of being mobile devices. The data processing system 110 can receive information indicating another (e.g., a first) content access computing device 125, that for example is not a device indicated by the global cluster, or is not a device indicated by the sub-cluster, and can determine that this first content access computing device 125 also has an interest in last minute airplane tickets, which is the interest category of the global cluster in this example.

Continuing with this example, the data processing system 110 may not have access to information indicating the type of device (or other status or characteristic) of this first content access computing device 125. For example, the data processing system 110 may not have access to data indicating whether the first content access computing device 125 is a mobile device or something else such as a desktop computer. The data processing system 110 can receive an indication (e.g., from the content publisher computing device 120 or from the first content access computing device 125) that the first content access computing device 125 is requesting access to or has accessed a travel related web page, for example, or that the first content access computing device 125 includes a software application related to air travel. Thus, in this example, without having access to information affirmatively (e.g. directly or conclusively) indicating the type of the first content access computing device 125, the data processing system 110 can determine based on interests associated with the first content access computing device 125 that it is associated with the global cluster having the interest category of last minute airplane tickets. However, the weight assigned to the sub-cluster of content access computing devices 125 having an interest in last minute airplane tickets can indicate that, for example, 80% of the content access computing devices 125 having an interest in last minute airplane tickets share the common characteristics of being mobile devices. In this example, the data processing system 110 can determine, based on the weight of the sub-cluster and based on the association between the interest of the first content access computing device 125 and the interest category of the global cluster, that the first end user device 125 is a mobile device. The determination in this example is an estimate or prediction that is correct, for example, 80% of the time. The data processing system 110 can use this information to select a content item as a candidate for placement with an information resource for display by the first content access computing device 125, such as an ad to download an application (e.g., a smartphone app) that when executed searches the computer network 105 for last minute airfare sales.

In some implementations, the data processing system 110 identifies a correlation between the content access computing device 125 and the global cluster based on the interest category of the global cluster and based on subject matter of an information resource of the content publisher computing device 120. For example, with global cluster, sub-cluster, and weight data stored as part of a universal model in the database 140, the data processing system 110 can identify a communication between a first content access computing device 125 and the content publisher computing device 120 for the first content access computing device to access an information resource. Using the network 105, the interest identification module 135 or other data processing system 110 component can obtain from or via the content publisher device 120 an indication of the subject matter of the content publisher computing device 120. For example, the data processing system 110 can determine that a web page of the content publisher computing device 120 includes subject matter about soccer. From this information, the data processing system 110 can determine an association or correlation between the first content access computing device 125 and the global cluster by evaluating global cluster data from the database 140. Based on this correlation, the data processing system 110 can determine a status of the first content access computing device 125 (e.g., a social statistic, type of device, or country of location) by communicating with the database to evaluate the weight data for sub-clusters of the global cluster having the interest category of soccer.

The sub-cluster creation module 130 can create multiple sub-clusters for a global cluster, where the multiple sub-clusters indicate the same interest category as a global cluster (e.g., an interest in soccer), but the content access computing devices 125 of the sub-clusters share a different common characteristic for each sub-cluster. For example, a first sub-cluster can have the interest category of soccer and the common characteristic of being a mobile device, and the second sub-cluster can indicate the same interest in soccer and have the common characteristic of being located in France. The data processing system 110 can assign different weights to the different sub-clusters. For example, the data processing system 110 can assign a weight of 0.25 to the first (e.g., mobile device) sub-cluster, and can assign a weight of 0.55 to the second (e.g., French location) sub-cluster. In this example, the weights indicate that content access computing devices interested in soccer have a 25% probability of being mobile devices, and have a 55% probability of being located in France. This global cluster, sub-cluster, and weight data can be stored in the database 140. Subsequently, for example, the data processing system 110 can determine that a first content access computing device 125 (e.g., that is not one of the end user devices 125 used to obtain or create the global cluster or sub-cluster data stored in the database 140) has an interest in soccer. Based on this association with the global cluster, and based on the weights assigned to the first sub-cluster and to the second-sub cluster, the data processing system 110 can determine the status of this first content access computing device 125. The status, for example, can reflect a 25% probability that the first content access computing device 125 is a mobile device, and have a 55% probability that the first content access computing device 125 is located in France. The data processing system 110 can make this determination without direct or conclusive information that affirmatively indicates the type or the location of the content access computing device 125.

In some implementations, the data processing system 110 identifies a content item to provide for display with an information resource to at least one content access computing device 125. For example, the data processing system 110 can identify a content item (e.g., an ad or online document) associated with the content provider 115 based on the status of an content access computing device 125, such as a social statistic shared with a segment of a population. For example, if the social statistic is associated with a certain segment of a general population, the data processing system 110 can identify a content item directed toward that segment of the population for display, or as a candidate for display, by the content access computing device 125 associated with that social statistic. The data processing system 110 can provide (or direct the content provider computing device 115 to provide) the content item via the network 105 to the content publisher computing device 120 or to the content access computing device 125 for display by the content access computing device 125. For example, a web browser of the content access computing device 125 can execute to render a web page associated with the content publisher computing device 120 that includes the content item associated with the content provider computing device 115.

In some implementations, the data processing system 110 utilizes machine learning techniques to populate the database 140 with at least one model having global cluster data for a plurality of global clusters and sub-clusters to determine content access computing device status across different countries, contexts, and social statistic categories. For example, rather than creating geographically limited models, e.g., one model for the Unites States, and another model for France, a single joint or universal model can be achieved using neural networks or logistic regression techniques to determine a status of the content access computing devices 125 regardless of location, contents, or social statistic categories.

Figure 2:
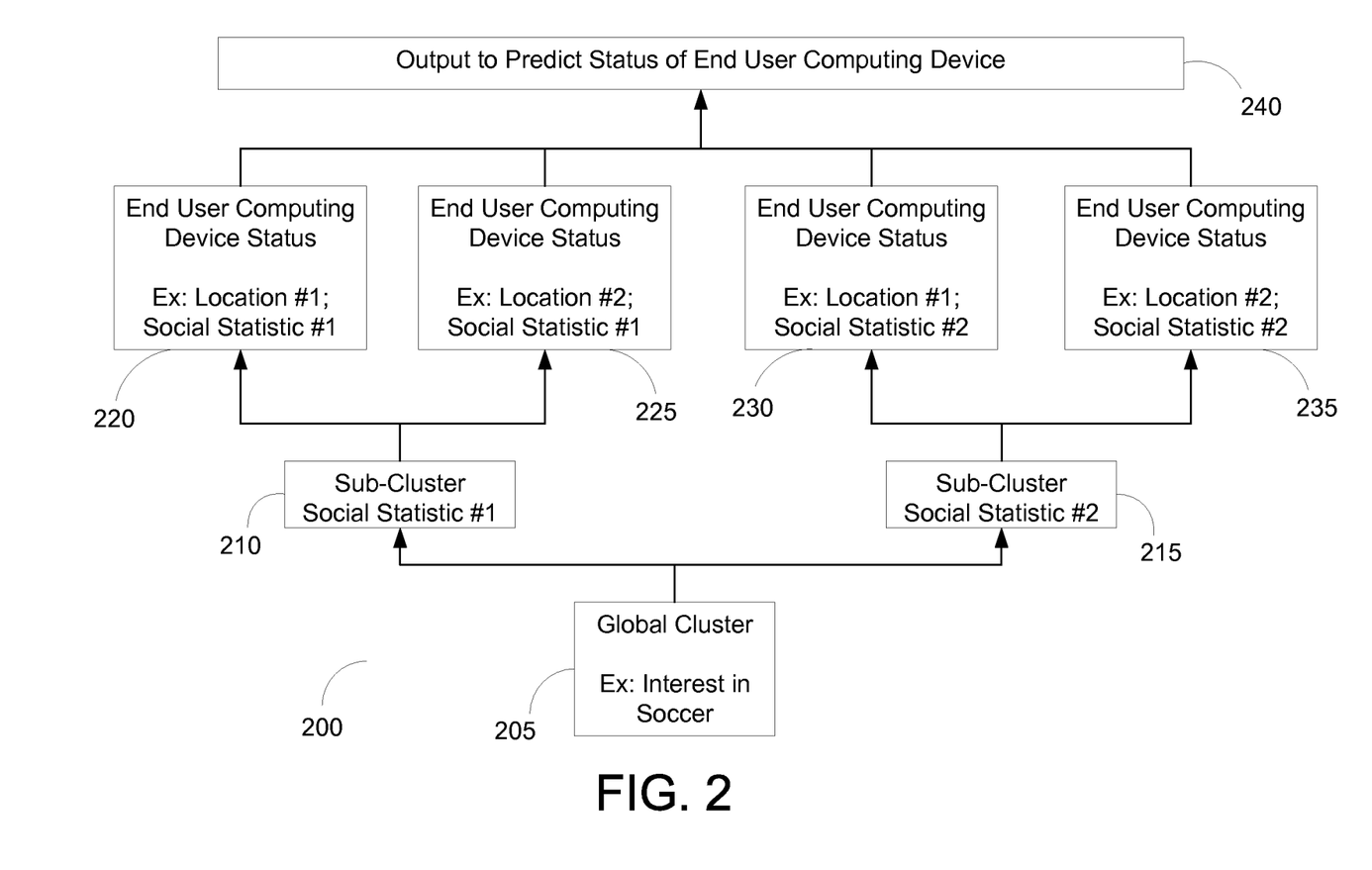
FIG. 2 is a block diagram depicting one example environment in which computing device characteristics can be determined from computer network activity, according to an illustrative implementation.

FIG. 2 is a block diagram depicting one example environment 200 to determine computing device characteristics from computer network activity. For example, the data processing system 110 can obtain data related to communications between the content access computing devices 125 and the content publisher computing devices 120, such as characteristics of the content access computing devices 125 or information about the subject matter of information resources hosted by or associated with the content publisher computing devices 120. From this information, the data processing system 110 can identify at least one global cluster 205 indicating, for example, an interest in soccer. The data input to the data processing system 110 used to make this determination can originate from computer network 105 communications from more than one country. The global cluster, including data identifying the global cluster can be stored in the database 140. In a joint model logistic regression or neural network machine learning implementation, the global clusters 205 can be considered a globally shared layer created responsive to input signals related to network 105 activity of the content access computing devices 125.

The data processing system 110 or component thereof such as the sub-cluster creation module 130 can create a plurality of first level sub-clusters such as a first sub-cluster 210 and a second sub-cluster 215, for example from the same or overlapping data pool used to create the global cluster 205 of a universal model including a plurality of global clusters. The sub-cluster 210 and the sub-cluster 215 can share the interest category, e.g., an interest in soccer and can be associated with different common characteristics. For example, the first sub-cluster 210 is a cluster of content access computing devices 125 having a first social statistic in common, and the second sub-cluster 215 is a different cluster of content access computing devices 125 having a second social statistic in common. An content access computing device 125 associated with both social statistics (or other characteristics, e.g., location or device type) can be associated with the first sub-cluster 210 and the second sub-cluster 215. The data processing system 110 can assign weight to the sub-cluster 210 to indicate a correlation between the first social statistic and the interest in soccer, and can assign a weight to the second sub-cluster 215 to indicate a correlation between the second social statistic and the interest in soccer. The first sub-cluster 210 and the second sub-cluster layer 215 can be considered a first level sub-cluster. In a joint model logistic regression or neural network machine learning implementation, the first sub-cluster 210 and the second sub-cluster 215 can be considered a layer of a universal model created from the globally shared layer for different social statistics or other characteristics.

In some implementations, the data processing system 110 determines at least one second level sub-cluster based on the global cluster 205 and the first level sub-cluster 210 or the first level sub-cluster 215. For example, the data processing system 110 can create second-level sub-clusters, such as at least one second level sub-cluster 220 of an content access computing device 125 based on the interest category of the global cluster 205 (e.g., an interest in soccer) and the weight assigned to the first sub-cluster 210. The second level sub-cluster 220 can indicate content access computing devices 125 of the first sub-cluster 210 that, in addition to characteristics and interest category of the first sub-cluster 210, also have a common characteristic of sharing the same general location, such as being located in France, for example.

The data processing system 110 can create other second-level sub-clusters from the first sub-cluster 210, such as at least one second level sub-cluster 225 that can indicate content access computing devices 125 of the first sub-cluster 210 that, in addition to characteristics of the first sub-cluster 125, also have a common characteristic that is different than the common characteristic of the first sub-cluster 210, such as of sharing a general location, different than the location of the first sub-cluster 210 e.g., being located in the United States. In some implementations, the content access computing devices 125 of the second level sub-clusters (e.g., the sub-cluster 220) include the common characteristics of the first level sub-cluster (e.g., the sub cluster 210) from which it was derived. For example, the content access computing devices 125 of the second-level sub-cluster 220 have the common characteristic of the first level sub-cluster 210 (e.g., a social statistic) and have the different common characteristic of the second level sub-cluster 220 (e.g., a location).

The data processing system 110 can assign weights to the second sub-level clusters, indicating a correlation between the common characteristic of those clusters (e.g., location) and the interest category of the second level cluster 220, which is also the interest category of the global cluster, (e.g., an interest in soccer). In the above example, the weight assigned to the first level sub-cluster 210 can indicate a correlation between the common characteristic of content access computing devices 125 of the sub-cluster 210 (e.g., the first social statistic) and the interest category of the global cluster 205 (e.g., the interest in soccer). The weight assigned to the second level sub-cluster 220 can indicate a correlation between the common characteristic of content access computing devices 125 of the sub-cluster 220 (e.g., the first location of France) and the interest category of the global cluster 205 (e.g., the interest in soccer).

The data processing system 110, for example to train a model using logistic regression or neural network schemes to determine a status of content access computing devices 125, can generate multiple sub-levels or multiple sub-clusters from multiple global clusters. For example, from the global cluster 205 of content access computing devices 125 associated with the interest category of soccer, the data processing system can create the second sub-level cluster 230 and the second sub-level cluster 235 from the first level sub-cluster 215. In this example, the first level sub-cluster 215 indicates content access computing devices 125 having a second social statistic in common. The second social statistic can be different than the social statistic of the first level sub-cluster 210.

The data processing system 110 or component thereof such as the sub-cluster creation module 130 can create second level sub-clusters based on the first level sub-cluster 215 and the global cluster 205, such as the second level sub-cluster 230 and the second level sub-cluster 235. The second level sub-clusters 230, 235, can indicate content access computing devices 125 that share the interest category (e.g., an interest in soccer), and that share the common characteristic of the first level sub-cluster 215 (e.g., a second social statistic). In this example, the second level sub-clusters 230, 235 can indicate different common characteristics from each other. For example, the second level-sub cluster 230 can indicate content access computing devices 125 having a first common location (e.g., France, or another location), and the second level sub-cluster 235 an indicate a second common location (e.g., the United States, or another location).

Based on the common characteristics of the sub-clusters, their respective weights, and the interest category, the data processing system 110 can determine or predict the status 240 of new or additional content access computing devices 125 that are not found part of the devices association with the creation of the global cluster 205 or the various sub-clusters. For example, the data processing system 110 can use input from a plurality of content access computing devices 125 to create a model of various global clusters and sub-clusters and their associated weights, and to store this information in the database 140. In some implementations, the data processing system 110 can identify (e.g., subsequent to creating the model, via network 105 communication) a new content access computing device 125 that is not one of the plurality of content access computing devices 125 used to train the model. For example, the data processing system 110 can determine that this new content access computing device 125, that was not used to create the global cluster 205 or associated sub-clusters, has an interest in soccer. In this example, the data processing system 110 may not have access to information indicating any characteristics of the new content access computing device 125 such as its location or any social statistics. From the interest category of the new content access computing device 125 and the weights assigned to the first and second level sub-clusters, the data processing system 110 can determine the status 240 of the new content access computing device. For example, the data processing system 110 can determine that the new content access computing device 125 has a status of having the first location (e.g., located in France) based on the weight assigned to the second level sub-cluster 220 and has the first social statistic based on the weight assigned to the first level sub-cluster 210 without data affirmatively indicating an association between the new content access computing device 125 and these characteristics. The data processing system 110 can also evaluate other weights assigned to other sub-clusters to make these determinations. In some implementations, the determination of the status 240 includes an estimate or a prediction as to whether or not an content access computing device 125 has characteristics common to those of the various sub-clusters.

Figure 3:
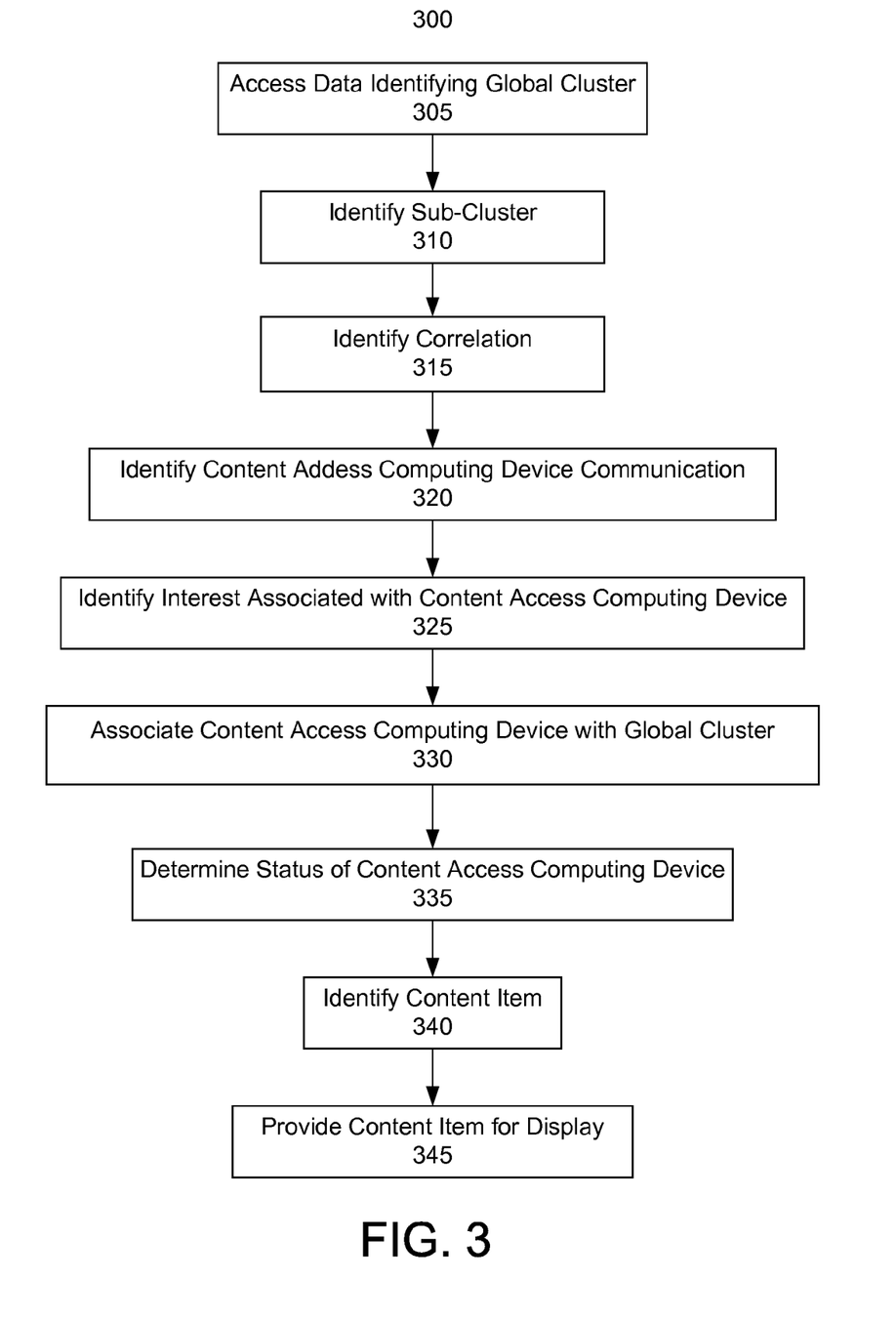
FIG. 3 is a flow diagram depicting an example method of determining computing device characteristics from computer network activity, according to an illustrative implementation.

FIG. 3 is a flow diagram depicting an example method 300 of determining computing device characteristics from computer network activity. The method 300 can access data identifying at least one global cluster (ACT 305). For example, based on communications via the network 105 between the content access computing devices 125, the content publisher computing devices 120, or the content provider computing devices 115, the data processing system can obtain data (ACT 305) for example about the subject matter of web pages and can use at least this data to identify one or more global clusters (ACT 305).

The method 300 can identify at least one sub-cluster (ACT 310). For example, the data processing system 110 can create, access, or identify sub-clusters that include content access computing devices 125 having a common characteristic, such as at least one common social statistic, location, or device characteristic such as being a generally fixed (e.g., desktop) or mobile computing device. The method 300 identify correlations between the common characteristic and the interest category (ACT 315). For example, the data processing system 110 can assign a weight to a sub-cluster (ACT 315) indicating that content access computing devices 125 associated with the interest category of the sub-cluster (e.g., soccer) have a probability as indicated by the weight (e.g., 0.8 or 80%) of having the common characteristic (e.g., a social statistic) of that sub-cluster.

In some implementations, the method 300 can identify content access computing device communication (ACT 320). For example, the method 300 can identify the global cluster (ACT 305), create sub-clusters (ACT 310), and assign weights to the sub-clusters (ACT 315) to create an content access computing device prediction model using neural network or logistic regression techniques. With the model created and associated information stored in the database 140, the method 300 can identify an content access computing device communication (ACT 320) and from or responsive to the communication can identify an interest associated with the content access computing device (ACT 325). Based on the interest, e.g., soccer, the method 300 can associate that content access computing device 125 with the global cluster (ACT 330). Based, for example, on the weights assigned to the sub-clusters or other indication of a correlation (ACT 315), the method 300 can determine at least one status (ACT 335) of that content access computing device 125.

In some implementations, the method 300 can identify at least one content item (ACT 340) associated with the content provider computing device 115. For example, the data processing system 110 can identify an ad or other online document or information resource having subject matter deemed by the data processing system 110 to be of interest content access computing devices 125 having the determined status (ACT 340). The method 300 can provide the content item for display by the content access computing device 125 (ACT 345). For example, the data processing system 110 can provide, or instruct the content provider computing device 115 to provide, the content item via the network 105 to the content publisher computing device 120 or to the content access computing device 125 for display with an information resource associated with the content publisher 120.

Figure 4:
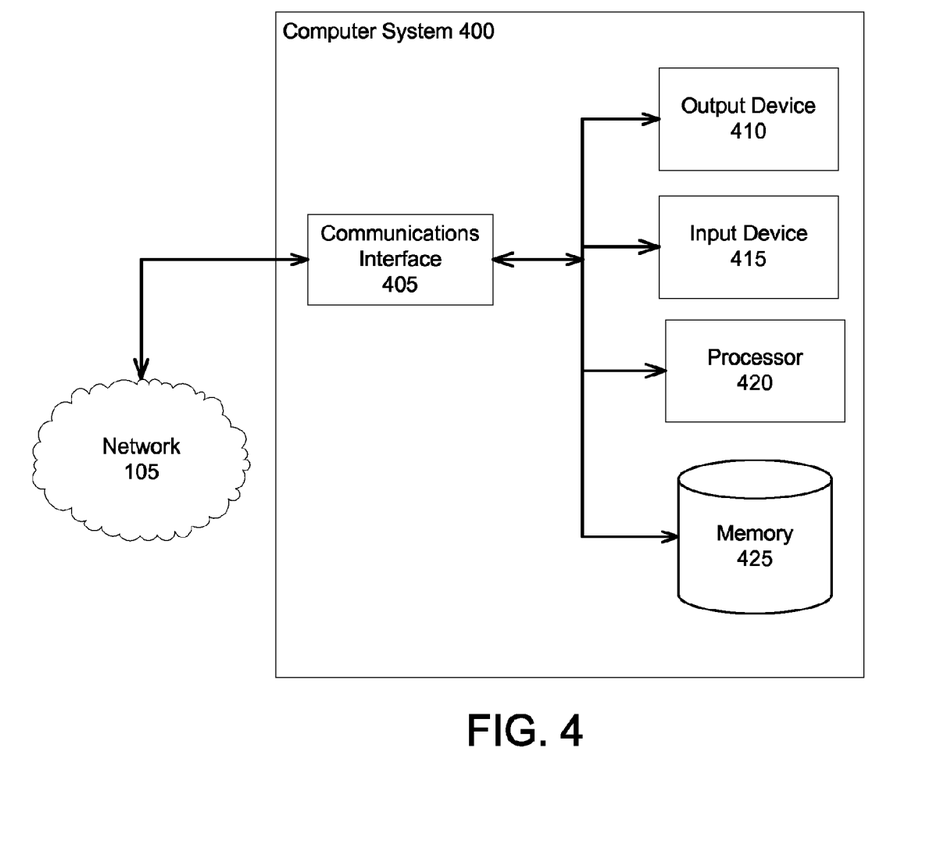
FIG. 4 is a block diagram illustrating a general architecture for a computer system that may be employed to implement elements of the systems and methods described and illustrated herein, according to an illustrative implementation.

FIG. 4 shows the general architecture of an illustrative computer system 400 that may be employed to implement any of the computer systems discussed herein (including the system 100 and its components such as the data processing system 110, the sub-cluster creation module 130 or the interest identification module 135) in accordance with some implementations. The computer system 400 can be used to provide information via the network 105, for example to determine a status of the content access computing device 125. The computer system 400 includes one or more processors 420 communicatively coupled to at least one memory 425, one or more communications interfaces 405, and one or more output devices 410 (e.g., one or more display units) and one or more input devices 415. The processors 420 can be included in the data processing system 110 or the other components of the system 100 such as the sub-cluster creation module 130 or the interest identification module 135.

The memory 425 can include computer-readable storage media, and can store computer instructions such as processor-executable instructions for implementing the operations described herein. The sub-cluster creation module 130 or the interest identification module 135, or the database 140 can include the memory 425 to store global cluster data, sub-cluster data including weight data, information about content items, information about information resources, interest category data, characteristics of content access computing devices 125, or status data of content access computing devices 125, for example. The processor(s) 420 can execute instructions stored in the memory 425 and can read from or write to the memory information processed and or generated pursuant to execution of the instructions.

The processors 420 can be communicatively coupled to or control the communications interface(s) 405 to transmit or receive information pursuant to execution of instructions. For example, the communications interface(s) 405 can be coupled to a wired or wireless network, bus, or other communication means and can allow the computer system 400 to transmit information to or receive information from other devices (e.g., other computer systems). One or more communications interfaces 405 can facilitate information flow between the components of the system 100. In some implementations, the communications interface(s) can be configured (e.g., via hardware components or software components) to provide a website as an access portal to at least some aspects of the computer system 400. Examples of communications interfaces 405 include user interfaces.

The output devices 410 can allow information to be viewed or perceived in connection with execution of the instructions. The input device(s) 415 can allow a user to make manual adjustments, make selections, enter data or other information, or interact in any of a variety of manners with the processor during execution of the instructions.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content server.

The term "data processing system" or "computing device" "module" "engine" "component" or "computing device" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The sub-cluster creation module 130 or the interest identification module 135 can include or share one or more data processing apparatuses, systems, computing devices, or processors.

A computer program (also known as a program, software, software application, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While operations are depicted in the drawings in a particular order, this should not be understood as requiring that such operations be performed in the particular order shown or in sequential order, or that all illustrated operations are required to be performed. Actions described herein can be performed in a different order.

The separation of various system components does not require separation in all implementations, and the described program components can be included in a single hardware or software product. For example, the sub-cluster creation module 130 or the interest identification module 135 can be a single module, a logic device having one or more processing circuits, or part of an online content item placement system.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of determining computing device characteristics from computer network activity, comprising:

accessing, by one or more processors of a data processing system from a database, data identifying a global cluster, the global cluster indicating an interest category determined based on communications between a plurality of content access computing devices and a plurality of content publisher computing devices;

identifying a sub-cluster of the global cluster based on a characteristic common to content access computing devices that are associated with the interest category indicated by the global cluster;

identifying a first correlation between the characteristic and the interest category;

identifying an interest associated with a first content access computing device not associated with the global cluster, based on a communication between the first content access computing device and a first content publisher computing device via a computer network;

associating the first content access computing device with the global cluster based on the interest associated with the first content access computing device and the interest category; and determining a status of the first content access computing device based on the association of the first content access device with the global cluster and the identified first correlation between the characteristic and the interest category, the status indicating a likelihood that the first content access device is associated with the characteristic.

2. The method of claim 1, wherein determining the status of the first content access computing device comprises determining the status of the first content access computing device without using information affirmatively indicating that the first content access computing device has the characteristic common to content access computing devices.

3. The method of claim 1, wherein determining the status of the first content access computing device comprises predicting that the first content access computing device has the characteristic common to content access computing devices.

4. The method of claim 1 further comprising:

identifying a second correlation between the first content access computing device and the global cluster based on the interest category and subject matter of an information resource associated with the communication with the first content publisher computing device; and determining the status of the first content access computing device based on the second correlation.

5. The method of claim 1, wherein the sub-cluster is a first sub-cluster, and the characteristic common to content access computing devices is a first characteristic, said method further comprising:

identifying a second sub-cluster of the global cluster based on a second characteristic common to content access computing devices;

identifying a second correlation between the second characteristic and the interest category;

assigning a first weight to the first sub-cluster based on the first correlation and a second weight to the second sub-cluster based on the second correlation; and associating the first content access computing device with the second sub-cluster based on the interest of the first content access computing device; and determining the status of the first content access computing device based on the second weight assigned to the second sub-cluster.

6. The method of claim 5 further comprising providing, from one or more processors of the data processing system to the first content publisher computing device or a second content publisher computing device, via the computer network, a content item for display with an information resource by the first content access computing device based on the status of the first content access computing device.

7. The method of claim 1 further comprising identifying a content item to provide for display with an information resource by the first content access computing device based on the status of the first content access computing device.

8. The method of claim 1 further comprising receiving, via the computer network, from the first content access computing device or the first content publisher computing device, an indication of the subject matter of the communication between the first content access computing device and the first content publisher computing device via the computer network.

9. The method of claim 1 further comprising identifying the characteristic common to content access computing devices as one of a country in which the content access computing devices are located, a type of the content access computing devices, and a social statistic of a population.

10. The method of claim 1 further comprising determining the status of the first content access computing device as one of a country in which the first content access computing device is located, a type of the first content access computing device, and a social statistic of a population.

11. The method of claim 1 further comprising:
identifying a second correlation between the first content access computing device and the global cluster; and
determining the status of the first content access computing device based on the second correlation.

12. The method of claim 1, wherein identifying the interest associated with the first content access computing device comprises identifying subject matter of an information resource associated with the communication with the first content publisher computing device.

13. The method of claim 1, wherein the sub-cluster indicates a sub-group of the plurality of content access computing devices, and the first content access computing device is not included in the sub-group of the plurality of content access computing devices.

14. A system of determining computing device characteristics from computer network activity, comprising a data processing system having one or more processors configured to:
access, from a database, data identifying a global cluster, the global cluster indicating an interest category determined based on communications via a computer network between a plurality of content access computing devices and a plurality of content publisher computing devices;
identify a sub-cluster of the global cluster based on a characteristic common to content access computing devices that are associated with the interest category indicated by the global cluster;
identify a first correlation between the characteristic and the interest category;
identify an interest associated with a first content access computing device not associated with the global cluster, based on a communication between the first content access computing device and a first content publisher computing device via a computer network;
associate the first content access computing device with the global cluster based on the interest associated with the first content access computing device and the interest category; and
determine a status of the first content access computing device based on the association of the first content access device with the global cluster and the identified first correlation between the characteristic and the interest category, the status indicating a likelihood that the first content access device is associated with the characteristic.

15. The system of claim 14, wherein the one or more processors are further configured to determine the status of the first content access computing device without using information affirmatively indicating that the first content access computing devices has the characteristic common to content access computing devices.

16. The system of claim 14, wherein the one or more processors are further configured to identify subject matter of an information resource associated with the communication with the first content publisher computing device.

17. The system of claim 14 wherein the one or more processors are further configured to receive, via the computer network, from one of the first content access computing device and the first content publisher computing device, an indication of the communication between the first content access computing device and the first content publisher computing device via the computer network.

18. The system of claim 14 wherein the one or more processors are further configured to provide, to one of the first content publisher computing device and a second content publisher computing device, via the computer network, a content item for display with an information resource by the first content access computing device based on the status of the first content access computing device.

19. A computer readable storage device storing instructions that when executed by one or more data processors, cause the one or more data processors to perform operations comprising:
accessing, from a database, data identifying a global cluster, the global cluster indicating an interest category determined based on communications between a plurality of content access computing devices and a plurality of content publisher computing devices;
identifying a sub-cluster of the global cluster based on a characteristic common to content access computing devices that are associated with the interest category indicated by the global cluster;
identifying a first correlation between the characteristic and the interest category;
identifying an interest associated with a first content access computing device not associated with the global cluster, based on a communication between the first content access computing device and a first content publisher computing device via a computer network;
associating the first content access computing device with the global cluster based on the interest associated with the first content access computing device and the interest category; and
determining a status of the first content access computing device based on the association of the first content device with the global cluster and the identified first correlation between the characteristic and the interest category, the status indicating a likelihood that the first content access device is associated with the characteristic.

20. The computer readable storage device of claim 19, wherein the instructions that when executed by the one or more data processors, cause the one or more data processors to perform operations further comprising determining the status of the first content access computing device as one of a country in which the first content access computing device is located, a type of the first content access computing device, and a social statistic of a population.

* * * * *